US009006655B2

(12) United States Patent
Nikittin et al.

(10) Patent No.: US 9,006,655 B2
(45) Date of Patent: Apr. 14, 2015

(54) THERMAL IMAGER WITH PROTECTIVE GRID

(75) Inventors: Alex S. Nikittin, San Jose, CA (US);
Salvador Alvarez, Jr., San Jose, CA (US)

(73) Assignee: Fluke Corporation, Everett, WA (US)

(*) Notice: Subject to any disclaimer, the term of this patent is extended or adjusted under 35 U.S.C. 154(b) by 126 days.

(21) Appl. No.: 13/335,048

(22) Filed: Dec. 22, 2011

(65) Prior Publication Data
US 2013/0161513 A1 Jun. 27, 2013

(51) Int. Cl.
*G01J 5/04* (2006.01)
*G01J 5/08* (2006.01)

(52) U.S. Cl.
CPC ............... *G01J 5/048* (2013.01); *G01J 5/0875* (2013.01)

(58) Field of Classification Search
CPC ....................................................... G01J 5/048
USPC .......................................... 359/854; 250/330
See application file for complete search history.

(56) References Cited

U.S. PATENT DOCUMENTS

| 4,609,820 A * | 9/1986 | Miyamoto ................. 250/338.1 |
|---|---|---|
| 5,493,126 A | 2/1996 | Taylor et al. |
| 5,621,270 A * | 4/1997 | Allen ............................ 313/420 |
| 8,023,818 B2 | 9/2011 | Schmidt et al. |
| 2010/0020389 A1 | 1/2010 | Schmidt |
| 2010/0329306 A1 | 12/2010 | Carlson et al. |

FOREIGN PATENT DOCUMENTS

JP 2001057642 A * 2/2001

OTHER PUBLICATIONS

Machine translation of JP 2001-57642 A.*
European Search Report and Examination Report dated Mar. 28, 2013 in related Application No. EP 1219730.4, 6 pgs.
Global Maintenance Technologies (GMTech) Brochure, "The IR-P Infra Red Camera Lens Protection System," IRISS, believed to be available more than one year before the filing date of the instant application, 1 pg.
GMTech Brochure, "Infra Red Panel Modifications," believed to be available more than one year before the filing date of the instant application, 1 pg.
Global Maintenance Technologies (GMTech) Products Profile Brochure, "Infra Red Inspection Windows," IRISS, believed to be available more than one year before the filing date of the instant application, 6 pgs.
Global Maintenance Technologies (GMTech) Brochure, "Infra Red Inspection Windows, What Can I see through an inra red window?" IRISS, believed to be available more than one year before the filing date of the instant application, 2 pgs.
Global Maintenance Technologies (GMTech) Brochure, "The Professional Thermographers Choice!" IRISS, believed to be available more than one year before the filing date of the instant application, 2 pgs.

(Continued)

*Primary Examiner* — Constantine Hannaher
(74) *Attorney, Agent, or Firm* — Fredrikson & Byron, P.A.

(57) ABSTRACT

A protective enclosure for a thermal imager having a window and protective grid. The protective grid is designed in relation to the lens of the thermal imaging device such that the grid pattern geometry and size accommodate the thermal imaging device's pupil size.

20 Claims, 10 Drawing Sheets

(56) References Cited

OTHER PUBLICATIONS

Global Maintenance Technologies (GMTech) Brochure, "The iR-iD TM Infra Red Label System," IRISS, believed to be available more than one year before the filing date of the instant application, 2 pgs.

Global Maintenance Technologies (GMTech) Brochure, "Infra Red Inspection Windows: Where Do I Start?" believed to be available more than one year before the filing date of the instant application, 6 pgs.

Global Maintenance Technologies (GMTech) Brochure, "Global Maintenance Technologies announce the release of our innovative VPF(R) range of Infra Red Inspection Ports," IRISS, believed to be available more than one year before the filing date of the instant application, 1 pg.

TEGG Corporation Brochure, "Preventive Maintenance Pays! Fact, Fiction, Smoke, Mirrors . . . What or who should one believe?" believed to be available more than one year before the filing date of the instant application, 12 pgs.

Global Maintenance Technologies (GMTech) Brochure, "Infra Red Inspection Windows: The Way Forward," (Nov. 9, 2005), pp. 1-21.

European Search Report, EP12197304, Apr. 8, 2013, 8 pages.

* cited by examiner

THERMAL IMAGER WITH PROTECTIVE GRID

BACKGROUND OF THE INVENTION

Industrial monitoring systems often employ thermal, or infrared (IR), imaging devices, which are preferably mounted in a fixed location to capture IR images of a target, which may be a particular portion of a piece of manufacturing equipment and/or a product in the midst of a manufacturing process. These devices are typically adapted to communicate with a remote monitoring station and, in some instances, are integrated with a process control package.

In harsh industrial environments it is often necessary to contain these imaging devices within a protective enclosure that keeps the imaging device cool and free of contaminations such as dust particles. The enclosure necessarily includes a window through which the thermal imaging device can view the target in the environment over a period of time.

In an explosion-proof housing, a protection grid must be used to protect the window from the external environment. The protective grid is typically constructed of steel bars which partially block the thermal imager's field of view (FOV). The shape and spacing of the bars is typically chosen with no consideration of the device located within the protective housing. As a result, the protective grid causes a strong, non-uniform attenuation pattern in the FOV thereby making the thermal measurements of the thermal imager non-radiometric.

It is desirable to design a protective grid that would produce an attenuation pattern of predictably low variation, uniformly distributed across the FOV which can be compensated for with a single transmissivity factor to keep the measurements radiometric.

BRIEF DESCRIPTION OF THE DRAWINGS

The following drawings are illustrative of particular embodiments of the invention and therefore do not limit the scope of the invention. The drawings are not to scale (unless so stated) and are intended to be used in conjunction with the explanations in the following detailed description. Embodiments of the invention will hereinafter be described in conjunction with the appended drawings, wherein like numerals denote like elements.

DETAILED DESCRIPTION

Figure 1:
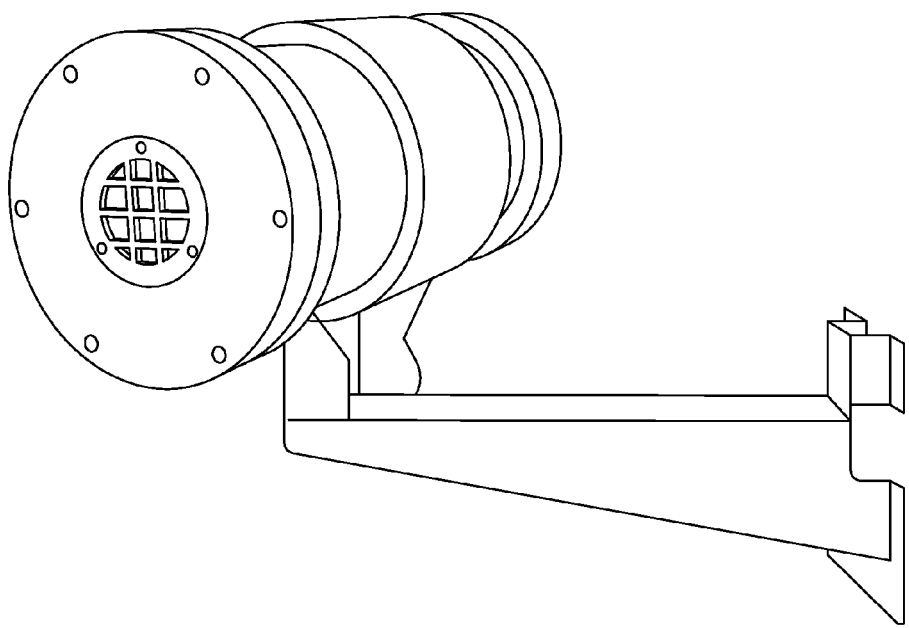
FIG. 1 is a commercially available prior art enclosure for a thermal imager.

FIG. 1 is a commercially available prior art enclosure for a thermal imager. The enclosure is to be used in hazardous environments where the forming of potentially explosive atmosphere is possible due to the presence of explosive gases, smoke, and powder. These explosion proof enclosures must withstand a stringent test of impact and pressure in which it is subjected to both impact by a metal object along with a consecutive surge of internal pressure, such as IEC 60079-0 and IEC 60079-1. When the enclosure houses a thermal imager, there must be a viewport that is transparent to infrared light of long wavelengths in order for the thermal imager to be able to operate. Choice of window materials that satisfy this requirement are very limited, and, moreover, none of them offer sufficient mechanical strength to pass the impact portion of the stringent test. The most common material used for the window is germanium (Ge) which with sufficient thickness, is capable of withstanding the pressure test but is too brittle to withstand the impact test. As a solution, a steel protective grid is placed outside of the Ge window (i.e., the protective grid is exposed to the hazardous environment). With this dual structure, the protective grid absorbs the force of impact while the solid Ge window withstands the pressure and provides the necessary sealing. Such a prior art enclosure is available from Tekno Systems S.p.A. and many other companies.

Commercially available explosion proof housing, such as that shown in FIG. 1, usually comes with a general purpose protective grid that is designed by the protective enclosure manufacturer for use with thermal imagers as well as non-thermal cameras. The protective enclosure is not designed with regard to the particular thermal imager the enclosure is to be used in conjunction with and thus does not account for its radiometric impact on the measurements made by the thermal imager. In general, these generic protective grids cause a highly non-uniform attenuation in the thermal imager's field of view which degrades the image quality cosmetically and severely impacts its radiometric performance.

Figure 2:
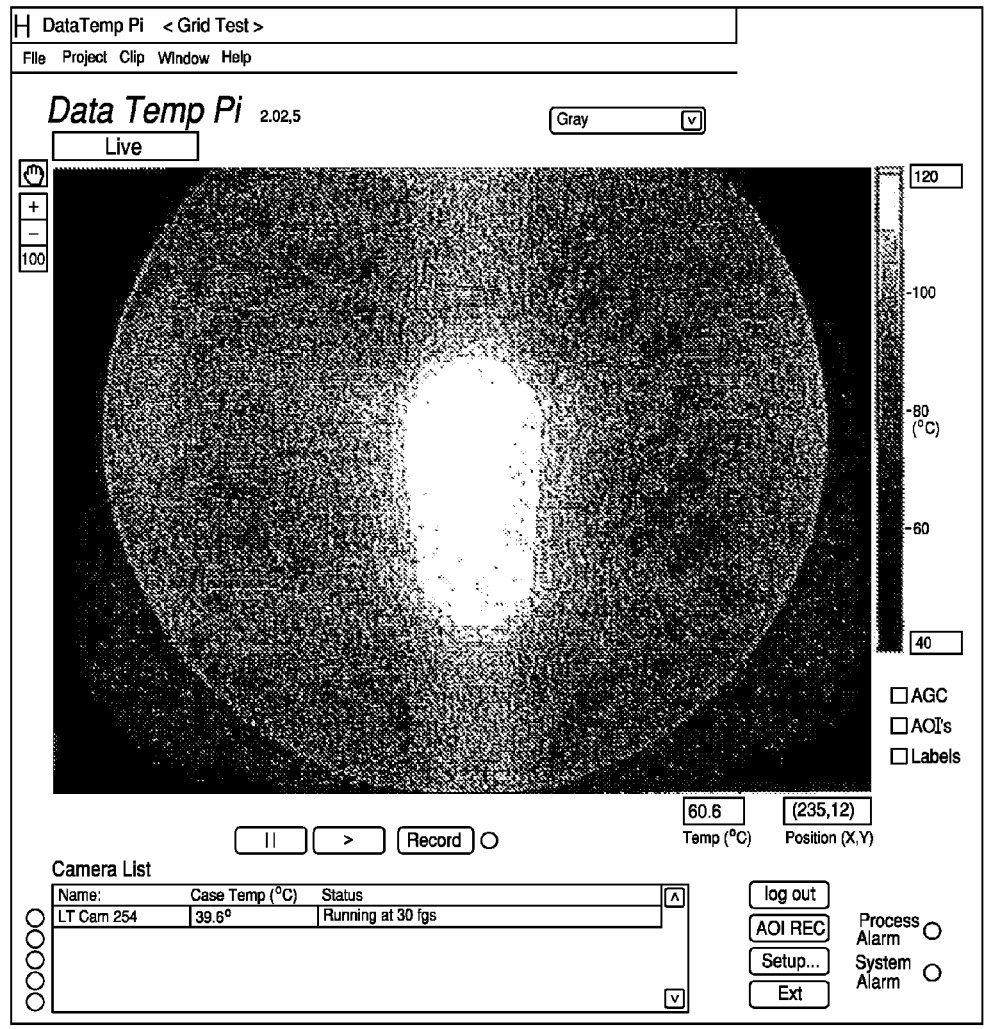
FIG. 2 is a thermal image of a uniformly heated round plate taken with a thermal imager located in the prior art enclosure.

FIG. 2 is a thermal image of a uniformly heated round plate taken with a thermal imager located in the prior art enclosure. The source of heat in this image is a round plate with an emissivity of about 0.91 held at a temperature of about 110° C. across the entire plate to make it uniformly heated. The image is taken with a Fluke Pi20 thermal imager located within a commercially available Tekno System CHEP IICG enclosure with a standard grid such as shown in FIG. 1. The field of view non-uniformity caused by the grid can be seen in FIG. 2 where there are bright spots and dark spots at various points in the image. An arbitrary emissivity correction factor of 0.8 was calculated using a plate emissivity of 0.91 multiplied by an estimated average attenuation value of 0.88 for the grid to obtain a reading close to 110° C. After applying an arbitrary emissivity correction of 0.8, temperature readings within the plate ranged from about 80° C. to about 120° C., a ±20% change in temperature across a uniformly heated plate. Thus, it can be seen that using such a standard protective grid caused significant error in the thermal imagers radiometric performance, as well as the image cosmetic quality.

Later, with reference to FIG. 10, a comparison will be made with a thermal imager housed in an explosion proof housing using a protective grid according to an embodiment of the invention.

Figure 3:
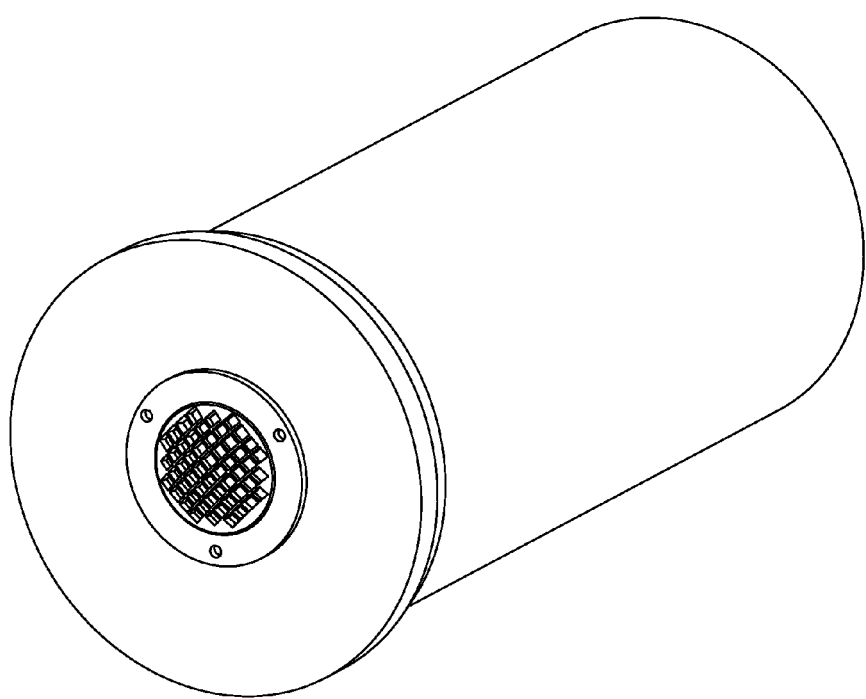
FIG. 3 is a perspective view of a protective enclosure for a thermal imaging device according to some embodiments of the invention.

FIG. 3 is a perspective view of a protective enclosure for a thermal imaging device according to some embodiments of the invention. The enclosure is designed to protect the thermal imager from explosive environments. The inventor has discovered that the optical signal attenuation caused by the protective grid can be more evenly distributed over the whole field of view of the imager when the grid pattern is specifically designed considering the lens geometry of the thermal imager as well as the position of the protective grid with reference to the lens of the thermal imager. While ideal spatial uniformity of attenuation is theoretically unattainable, it is possible to design a grid that provides attenuation fluctuating across the field of view about a mean value within a predictable range. The average attenuation of the grid can be compensated for preferably with one transmissivity coefficient. Many, with the exception of very small lenses of about less than 6 millimeters, practically available thermal imagers and protective enclosures combinations allow one to design an appropriate grid pattern to achieve both the required mechanical strength while keeping the grid attenuation non-uniformity at an acceptably low level.

The embodiments of the invention attempt to design a "radiometrically uniform" grid. There are several steps to designing such a grid.

Figure 8:
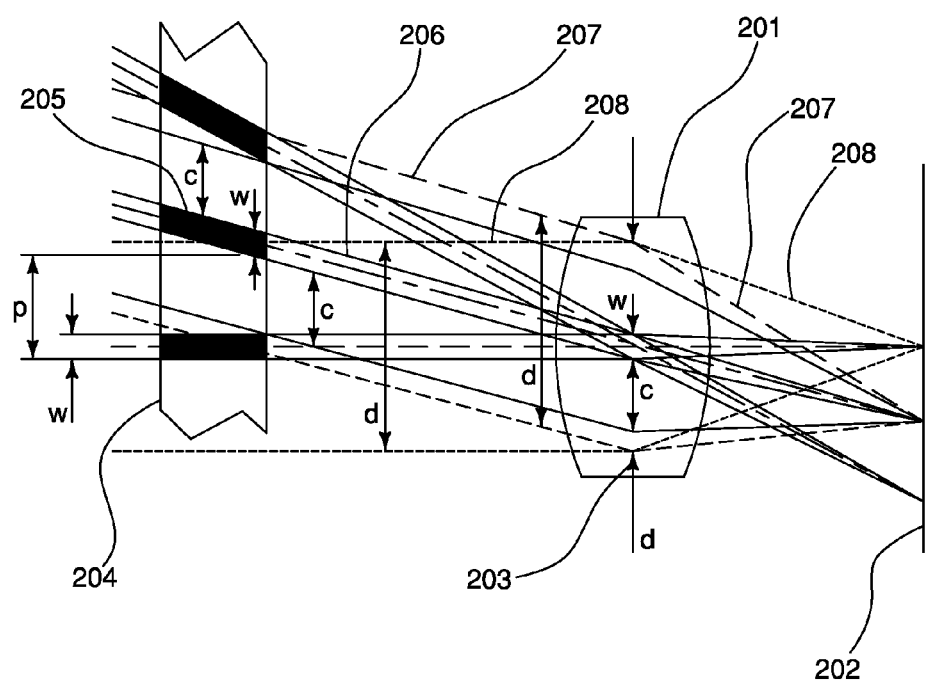
FIG. 8 is a schematic illustrating the operating principles between a protective grid according to an embodiment of the invention, incoming beams, the lens and image plane of the imager.

The first step is to determine the thermal imager's lens input pupil size and its position relative to the grid. FIG. 8 is a schematic illustrating the operating principle between the protective grid according to an embodiment of the invention, incoming beams, the lens of the thermal imager and the image plane of the imager. Reference 201 is the imager's lens, reference 202 is the imager's image plane, and reference 204 is the protective grid, all of which are shown in cross-sectional representation.

The lens 201 has a pupil 203 that is defined by the lens' aperture, and it is located in an imaginary plane where beams from every point in an object plane intersect. Actual lens design may be complex, and input and output pupil planes may be different, residing inside or outside the physical lens' 201 outline as shown. For simplicity, FIG. 8 ignores thick lens considerations and shows input and output pupils matching in one plane as it would be in an ideal, infinitely thin lens. As seen in FIG. 8, the input pupil 203 defines a cross-section of an optical beam 207 from every point in the image plane 202 to the corresponding points in the object plane. When lens 201 is focused at a close distance to the grid plane 204, the beam 207 is converging; with the focus at infinity, it is collimated. For purposes of the design of the embodiments of the invention, the object plane is much further than the grid, the beam may be considered collimated and its cross section at the grid plane is assumed to be equal the pupil diameter 203 of the lens 201.

Shown in FIG. 8 are the following parameters:
w=width of the bars in the protective grid
d=pupil diameter 203 of lens 201
p=grid pitch measured from an inside surface (i.e., surface facing lens 201) of the protective grid 204.
c=width of an unblocked portion of a beam adjacent to a bar With a known lens design and thermal imager structure, the input pupil size and position within the thermal imager body will be known. If it is not, then they may be derived by external optical measurements.

The thermal imager position relative to the protective grid is usually restricted by the design requirements of the protective enclosure. For best uniformity results, optical distance between the input pupil of the lens 201 and the protective grid 204 should be as short as possible. The optical distance will be shorter than the physical distance because of refraction in the window (not shown) which should be accounted for. FIG. 8 illustrates the beams propagating in the optical space with the window refractive offset subtracted.

The optical distance between the input pupil of the lens 201 and the protective grid 204 defines the total size of the grid area, which should be larger than the field-of-view cross-section to avoid vignetting.

After the lens input pupil size and position relative to the grid is determined, the next step is to select the grid pattern geometry and size in relation to the input pupil diameter of the lens 201.

Figure 12:
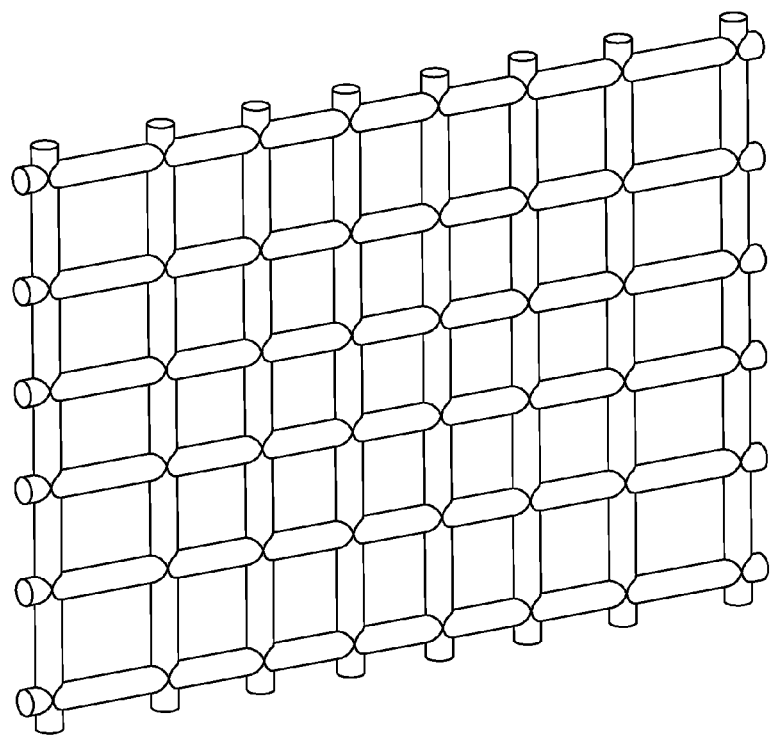
FIG. 12 is a schematic of an irregular grid pattern according to an embodiment of the invention.

In a preferred embodiment a quadratic hole pattern has been chosen for the protective grid geometry. The hole pattern has a constant pitch, p, and equal bar widths, w. Such a pattern has been found to offer a good compromise between optical performance, mechanical strength, and manufacturability. However, the embodiments of the invention are not limited to such a geometry and other patterns are possible such as triangular, hexagonal, circular, for example. In addition, the geometry may have an irregular pattern as opposed to a uniform pattern as shown in FIG. 12.

FIG. 8 is a schematic illustrating the operating principles between a protective grid according to an embodiment of the invention, incoming beams, the lens and image plane of the imager.

Figure 9:
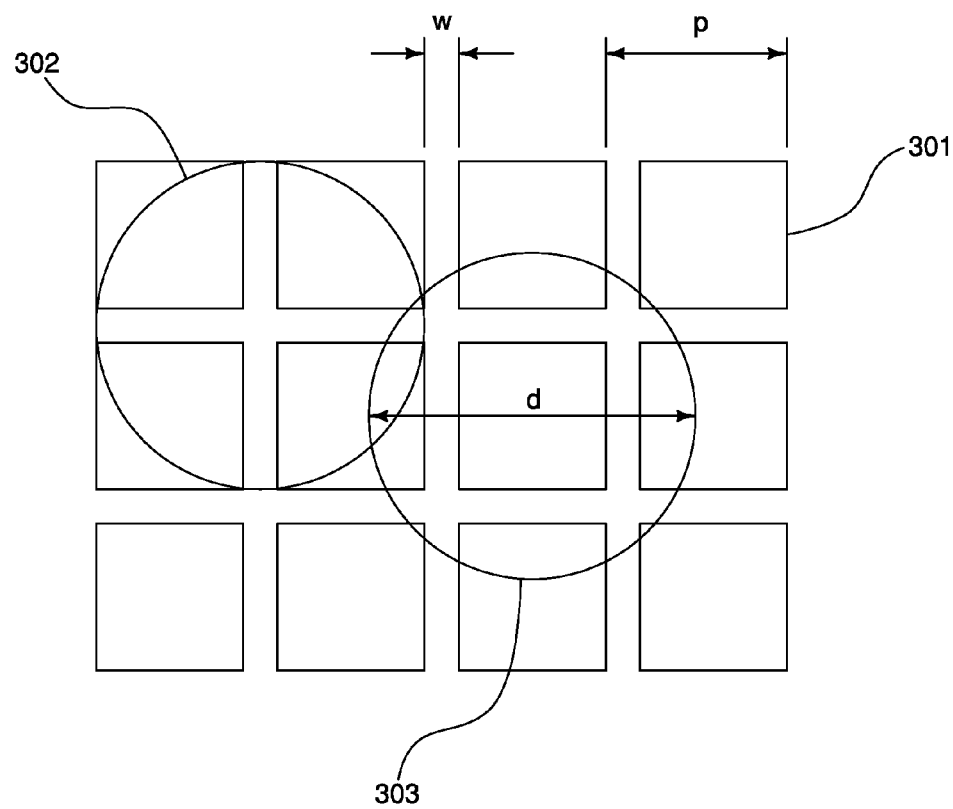
FIG. 9 is a schematic illustrating the best and worse case scenarios of attenuation by the protective grid according to an embodiment of the present invention.

FIG. 9 is a schematic illustrating the best and worse case scenarios of attenuation by the protective grid according to an embodiment of the present invention. FIG. 9 also illustrates the grid pitch, p, and bar width, w, in relation to the pupil diameter, d.

Attenuation caused by the protective grid on every point in the field of view (FOV) is defined as the ratio of an area blocked by the protective grid, to the cross-section of the beam at that point on the field of view.

With a quadratic pattern 301 for the protective grid, attenuation extremes will be where the beam is in position 302 and position 303, with position 302 being the best case for minimal attenuation and position 303 being the worst case for maximum attenuation. Assuming the grid pattern shown in FIG. 9 has the following dimensions:
w=1
p=5
d=9,
then the following results follow.

| | |
|---|---|
| Pitch-to-pupil size ratio | p/d = 0.56 |
| Width-to-pitch ratio | w/p = 0.2 |
| Beam cross-section | Sb = 63.6 |
| Minimum area blocked in position 302 (i.e., area covered by bars within 302) | Smin = 17 |
| Maximum area blocked in position 303 (i.e., area covered by bars within 303) | Smax = 26 |
| Maximum transmissivity across FOV | Tmax = 1 − Smin/Sb = 73.3% |
| Minimum transmissivity across FOV | Tmin = 1 − Smax/Sb = 59.1% |
| Mean transmissivity and variance | Tav = 66.2% ± 7.1% |

With a wide band angle 8-14μ thermal imager, this mean transmissivity and variance translates into an approximate ±4% temperature reading error at elevated object temperatures. The above values are examples given the particular dimensions of w, p, and d. Specific dimensions will depend upon the particular geometry chosen (choice of w, d, and p).

The spatial non-uniformity error introduced by the grid will depend on the ratios p/d and w/p. The smaller these values are, the better the optical performance achieved. Ideally, the p/d ratio should be less than about 0.5 to get a more uniform error and the w/p ratio should be less than about 0.3 and preferably less than about 0.2.

Actual dimension choices should be stipulated between optical performance and mechanical restraints.

Some imagers with a very small lens pupil may be unsuitable for this application, as the bars width w, required to achieve acceptable level of FOV uniformity, would become too small to be manufacturable and/or to withstand the impact test. Practically, with a lens pupil p or 12 mm or greater, a choice of values p/d<0.5 and w/p<0.2 enables to construct a manufacturable grid, capable to withstand the ATEX impact test and acceptably low FOV temperature reading error of ±2% or smaller.

After the grid pattern geometry and size is selected, the next step is to adjust the grid geometry to maintain a constant w/p ratio in angular projection on the pupil p lens.

As it is seen in FIG. 8, the width w of a beam 206, blocked by every bar in the pupil 203, should remain in constant proportion with the width c of an adjacent unblocked portion of a beam, for the average grid attenuation to also remain constant. This requirement can be met, using one of the two methods:

a) Make the cross-section of the bars 205 round or rectangular, oriented normal to the grid 204 plane, and use an irregular pattern with the pitch p increasing/bars width w decreasing from center to peripheral, or both, to maintain a constant w/c ratio in projection on the pupil plane; or b) Use a regular pattern with a constant pitch p and bar width w, but slant every bar cross-sections 205 at an angle, as shown in FIG. 8, such as its centerline is oriented along the rays, originating from the center of pupil 203, and width of the blocked beam 206 equals the bar physical width w in the grid plane, thus satisfying the rule of keeping the projected w/c ratio constant. This approach has been chosen for the grid design embodiment shown in FIGS. 4-7.

This is accomplished by orienting the bars of the grid with their cross-section axes fanning out from a point at a predetermined location (i.e., the imager should be mounted such that this point is in the center of the pupil of the lens). Thus, the bars of the grid are oriented converging towards the optical center of the lens as seen in FIG. 8.

To accommodate a given FOV angle without vignetting, the grid dimensions should be at least the size of FOV angular projection on the grid plane plus the pupil radius on each side/corner, because the beam 207 from every point in the image plane 202 should clear through the grid.

The fact that the rays angle in peripheral area, within the last pupil radius, cannot exceed the diagonal angle of the FOV, can be exploited to increase illumination in the corners, by keeping the last row(s) of the grid bars parallel to each other. This may be useful to correct grid pattern distortion in the cold-stamped implementation of a "Dome" design, discussed below.

The preferred grid material in explosion proof applications is low carbon, annealed stainless steel, such as types 316, 304, or 303. These types of steel can absorb significant energy of the impact in plastic deformation region. Standard impact test specifications do allow for plastic deformation in the grid, for as long as it protects the window from breaking. The window may be crystal-based and include calcium fluoride, germanium, zinc selenide and sapphire, for example.

To reduce optical scatter, caused by the grid, the side and the back (facing the window) surfaces of the bars should have a diffuse coating with low reflectance in the thermal imaging spectral range. Coating on the front side is optional.

To create the grid design having a regular pattern with a constant pitch p and bar width w, two approaches may be used: a "flat" type grid or a "dome" type grid. In the "flat" type grid, designed by the above rules and shown in FIGS. 4 and 5, this design takes the advantage of a rectangular shape of FOV cross-section to make the bars as short as possible thereby increasing the mechanical strength of the grid. To create such a grid, however, is a bit more complicated since it requires a multi-axis Electric Discharge Machining (EDM) or water jet machine to manufacture slanted cut-outs.

Figure 7:
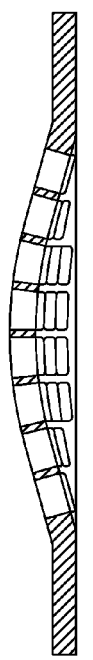
FIG. 7 is a cross-sectional view of the protective grid shown in FIG. 6.
Figure 6:
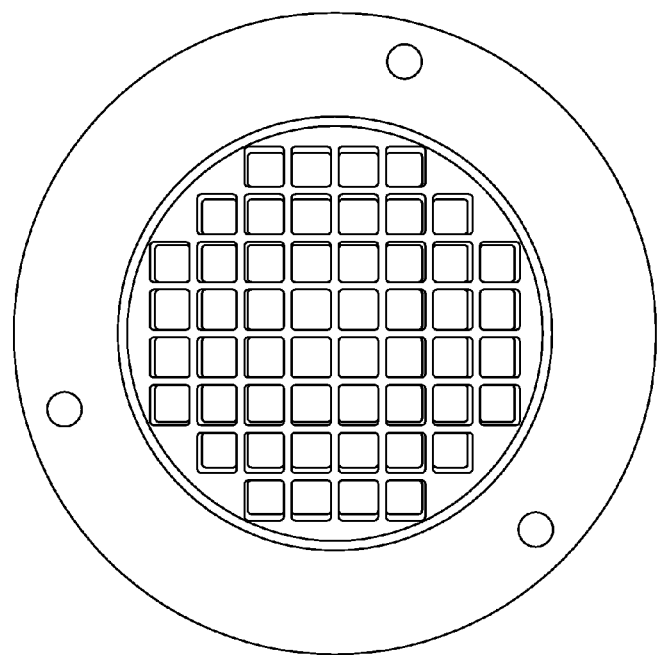
FIG. 6 is a front view of an embodiment of the protective grid according to another embodiment of the invention.

In the "dome" type grid, shown in FIGS. 6 and 7, fabrication is less complicated than the "flat" type grid and straight-perpendicular cut-outs can be made in a flat blank on a common 2-axis machine. Then, the pre-cut flat can be stamped out into a dome shape, while the grid bars automatically assume the required angles in the process. The disadvantages are that the grid area must be close to circular for uniform stretch resulting in the bars in the central area becoming thinner because of greater deformation. The first is partially offset by a benefit of the dome shape offering more room in the center for deformation during impact. The second one is mitigated by translating the dome shape from spherical in the central area to conical towards peripheral, thus making the peripheral bars cross-sections parallel to each other, as explained above, and flattening the average attenuation profile.

Figure 5:
FIG. 5 is a cross-sectional view of the protective grid shown in FIG. 4.
Figure 4:
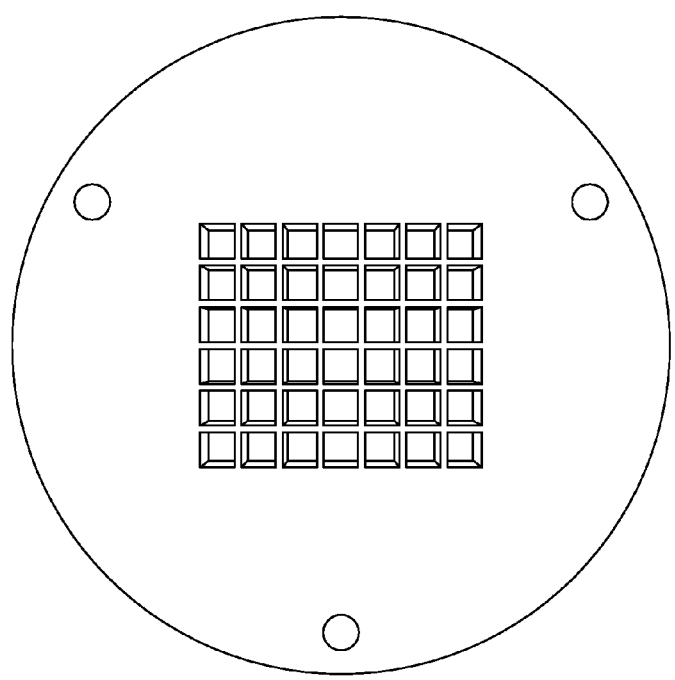
FIG. 4 is a front view of an embodiment of the protective grid according to an embodiment of the invention.
Figure 10:
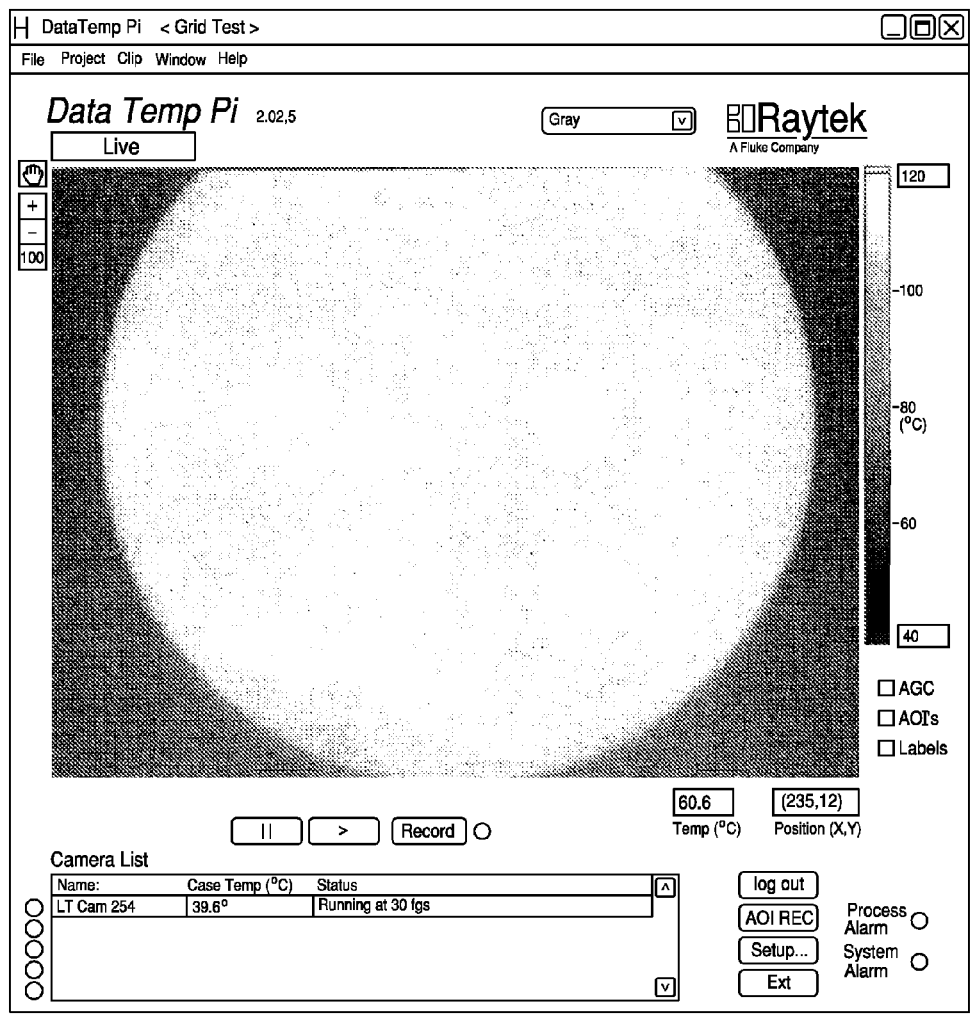
FIG. 10 is a thermal image taken of a uniformly heated round plate taken with a thermal imager located behind a protective grid shown in FIG. 4.

FIG. 10 is a thermal image taken of a uniformly heated round plate taken with a thermal imager located behind a protective grid shown in FIGS. 4 and 5. Comparing FIG. 10 with FIG. 2, one can see the more uniform image in FIG. 10. Its associated temperature readings are also more uniform compared with those of FIG. 2.

Figure 11:
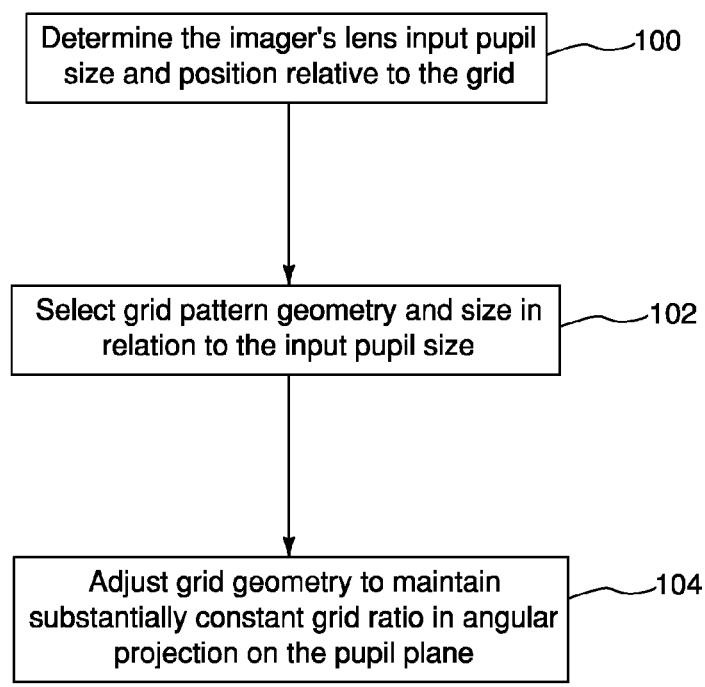
FIG. 11 is a flow chart of a method of designing a protective grid according to a preferred embodiment of the invention.

FIG. 11 is a flow chart of a method of designing a protective grid according to a preferred embodiment of the invention. As previously mentioned, the first step is to determine the imager's lens input pupil size and position relative to the grid at step 100. Then, at step 102, a grid pattern geometry and size is selected relative to the input pupil size. Finally, at step 104, the grid geometry is adjusted to maintain a substantially constant grid ratio in angular projection on the pupil plane.

What is claimed is:

1. A protective enclosure for enclosing a thermal imaging device mounted in a predetermined location, the thermal imaging device having a pupil plane and a lens, the thermal imaging device to be used in a hazardous environment comprising:

a housing having a proximal end and a distal end and a sidewall coupling the proximal end to the distal end, such that the sidewall surrounds the thermal imaging device when the thermal imaging device is in the predetermined location;

a window assembly located near the distal end of the housing, the window assembly comprising:

a window providing passage for infrared radiation to the thermal imaging device within the enclosure; and a protective grid comprising a first plurality of intersecting bars and a second plurality of intersecting bars, the protective grid located on one side of the window at the distal end of the housing wherein the protective grid is exposed on one side to the environment and is exposed on an opposite side to the window, the protective grid having a geometry constructed in relation to the thermal imaging device such that a ratio of blocked beam to adjacent unblocked beam projected on the pupil plane remains constant thereby providing a relatively uniform attenuation in the field of view of the thermal imaging device which may be compensated for with one transmissivity coefficient; wherein each of the first plurality of bars has a cross section with an elongate dimension defining a line extending therethrough, the bars oriented such that the lines extending through the elongate dimensions converge towards a first location within the housing, the first location being substantially coincident with the center of the lens of a thermal imaging camera when the thermal imaging camera is mounted in the predetermined location such that the protective grid provides relatively uniform attenuation from a field of view external to the enclosure to the first location within the housing; and each of the second plurality of bars is located near the periphery of the grid and has an elongate dimension oriented parallel to the elongate dimension of at least one adjacent bar, the at least one adjacent bar being in either the first plurality of bars or the second plurality of bars.

2. The enclosure of claim 1 wherein the protective grid comprises steel.

3. The enclosure of claim 1 wherein the window comprises germanium.

4. The enclosure of claim 1 wherein the plurality of intersecting bars define a hole pattern in the protective grid, and wherein the hole pattern has a grid pitch, p, and each bar has a width, w, wherein the width-to-pitch ratio, w/p, is less than about 0.25.

5. The enclosure of claim 4 wherein the thermal imaging device has a lens with a pupil diameter, d, and the pitch-to-pupil diameter ratio, p/d, is less than about 0.6.

6. The enclosure of claim 4 wherein the protective grid has a constant pitch, p, and constant width, w.

7. The enclosure of claim 1 wherein the uniformity error is less that about ±4%.

8. The enclosure of claim 1 wherein the uniformity error is less that about ±2%.

9. The enclosure of claim 1 wherein the ratio of the width, w, of a beam blocked by a bar in the pupil should remain constant in relation with the width, c, of an adjacent unblocked portion of a beam for the average grid attenuation to remain constant.

10. The enclosure of claim 1 wherein the cross-section of the bars is rectangular.

11. A method of constructing a protective grid to be used with a thermal imager in a hazardous environment, comprising:

determining the imager's lens input pupil size and position relative to the grid;

selecting a grid pattern geometry characterized by a pitch, p, and bar width, w, and size in relation to the input pupil size; and adjusting the grid geometry to maintain a substantially constant ratio of w to p in angular projection on the pupil plane.

12. The method of claim 11 wherein the adjusting the grid geometry comprises:

designing a regular grid pattern with a constant pitch, p, and constant bar width, w.

13. An industrial monitoring system, comprising:

a protective enclosure for a thermal imaging device, the protective enclosure comprising:

a housing;

a window assembly located near the distal end of the housing, the window assembly comprising:

a window providing passage for infrared radiation to the thermal imaging device within the enclosure;

a thermal imaging device adapted to communicate with a remote image monitoring center of the system; and a protective grid located on one side of the window at the distal end of the housing wherein the protective grid is exposed on one side to the environment and is exposed on an opposite side to the window, the protective grid comprising a plurality of intersecting bars defining a hole pattern, wherein the hole pattern has a grid pitch, p, and each bar has a width, w, and configured such that (i) the pitch increases, (ii) the bar width decreases, or (iii) both, from the center of the grid to the peripheral;

said thermal imaging device located inside said enclosure at a predetermined position in relation to said grid, such that the protective grid provides a relatively uniform attenuation in the field of view of the thermal imager which may be compensated for with one transmissivity coefficient.

14. The enclosure of claim 13 wherein the protective grid comprises steel.

15. The enclosure of claim 13 wherein the window comprises germanium.

16. The enclosure of claim 13 wherein the width-to-pitch ratio, w/p, is less than about 0.25.

17. The enclosure of claim 13 wherein the thermal imaging device has a lens with a pupil diameter, d, and the pitch-to-pupil diameter ratio, p/d, is less than about 0.6.

18. The enclosure of claim 13 wherein the uniformity error is less that about ±4%.

19. The enclosure of claim 13 wherein the uniformity error is less that about ±2%.

20. The enclosure of claim 13 wherein the width, w, of a beam blocked by a bar in the protective grid should remain in a constant ratio with the width, c, of an adjacent unblocked portion of a beam for the average grid attenuation to remain constant.

* * * * *